United States Patent
Eaves et al.

(10) Patent No.: US 6,320,731 B1
(45) Date of Patent: Nov. 20, 2001

(54) FAULT TOLERANT MOTOR DRIVE ARRANGEMENT WITH INDEPENDENT PHASE CONNECTIONS AND MONITORING SYSTEM

(75) Inventors: Stephen S. Eaves, Charlestown, RI (US); Matthew L. Kasson, Voluntown, CT (US)

(73) Assignee: Electric Boat Corporation, Groton, CT (US)

( * ) Notice: Subject to any disclaimer, the term of this patent is extended or adjusted under 35 U.S.C. 154(b) by 0 days.

(21) Appl. No.: 09/577,809

(22) Filed: May 24, 2000

(51) Int. Cl.[7] ................................. H02H 3/28; H02H 3/16
(52) U.S. Cl. ................................. 361/42; 361/30; 388/903
(58) Field of Search ................................. 361/23, 31, 33, 361/20, 21, 30, 42, 46, 47, 48; 318/806, 293; 324/521, 525; 388/903

(56) References Cited

U.S. PATENT DOCUMENTS

| | | |
|---|---|---|
| 1,888,718 | 11/1932 | Friedländer . |
| 2,672,584 | 3/1954 | Rolf . |
| 2,941,121 | 6/1960 | Gladnick et al. . |
| 3,242,383 | 3/1966 | Opad . |
| 3,584,259 | 6/1971 | Traub et al. . |
| 3,736,470 | 5/1973 | Ford et al. . |
| 3,840,783 * | 10/1974 | Eckart ................................. 361/47 |
| 3,999,104 | 12/1976 | Lardennois . |
| 4,138,707 * | 2/1979 | Gross ................................. 361/45 |
| 4,297,738 * | 10/1981 | Lee ................................. 361/42 |
| 4,319,298 | 3/1982 | Davis et al. . |
| 4,356,443 | 10/1982 | Emery . |
| 4,363,065 | 12/1982 | Hasegawa et al. . |
| 4,525,656 * | 6/1985 | Kato ................................. 318/85 |
| 4,823,226 | 4/1989 | Reed et al. . |
| 4,837,654 | 6/1989 | Chen et al. . |
| 5,168,236 | 12/1992 | Schuyler . |
| 5,453,901 * | 9/1995 | Lackey ................................. 361/21 |
| 5,508,620 | 4/1996 | Pfiffner . |
| 5,519,600 | 5/1996 | Ahladas . |
| 5,521,787 | 5/1996 | Baker et al. . |
| 5,587,864 | 12/1996 | Gale et al. . |
| 5,691,643 | 11/1997 | Ishiguro et al. . |
| 5,751,132 | 5/1998 | Horvath et al. . |

* cited by examiner

Primary Examiner—Kim Huynh
(74) Attorney, Agent, or Firm—BakerBotts, LLP

(57) ABSTRACT

In the embodiment described in the specification, a fault tolerant motor drive circuit arrangement includes a motor having three stator windings which are electrically isolated and are supplied by separate single phase drive circuits, each having a differential current sensor detecting current in both circuit conductors and an overcurrent sensor in one circuit conductor, along with a ground connection for each circuit having a ground conductor with an overcurrent sensor and a high resistance with a voltage sensor across the high resistance. A monitoring unit receives signals from all of the differential current sensors, overcurrent sensors and voltage sensors to provide indications of the location of insulation faults or incipient faults in the windings.

14 Claims, 2 Drawing Sheets

FAULT TOLERANT MOTOR DRIVE ARRANGEMENT WITH INDEPENDENT PHASE CONNECTIONS AND MONITORING SYSTEM

BACKGROUND OF THE INVENTION

This invention relates to drive arrangements for motors and generators which are subject to internal wiring faults.

Motors and generators, referred to herein as "electric machines", are typically arranged with phase windings which are connected internally in a wye or delta configuration. These connections provide a low impedance path for fault current to flow in the event of an inter-phase fault. Similarly, other winding arrangements that do not provide any isolation between phases result in a low impedance path for inter-phase fault currents to flow. For example, when a phase-to-phase short occurs because the insulation between two phase conductors deteriorates or when two or more phases are connected externally during or as a result of maintenance work high fault currents are produced through the low impedance paths between phases.

For a bolted phase-to-phase fault, fault current contributes to the fault from the source since a continuous circuit through the fault is provided by the interconnections of the phases at the source. Fault current is contributed to faulted electric machine stator windings because of the continued rotation of a permanent magnet field within the faulted stator winding. Such fault current flows through the fault because a continuous circuit is provided by the interconnected phases of the windings.

Electric machines with controllable fields such as wound field synchronous machines have the ability to limit the duration of fault current contribution by de-energizing the magnetic field. Other machines, such as the permanent magnet type cannot limit duration of fault current contributed by the machine during a coast down subsequent to power circuit tripping as a result of the fault. A three-phase fault is similar to the above described phase-to-phase fault except that it involves all three phases instead of just two phases. Continued operation with a faulted three phase machine, if possible at all, would require increasing the machine leakage reactance which would require a trade-off with respect to normal performance characteristics.

A phase-to-ground fault occurs when motor insulation fails between a conductor and a ground such as a grounded motor structure. Phase-to-ground fault current magnitudes have previously been mitigated by utilizing a high resistance ground impedance between a multiple phase system neutral and ground. However, with typical delta or wye connected systems, this resistance to ground consists of a single resistor connected to the neutral of a wye system or the derived neutral of a delta system and the value of that resistance must be such that the impedance is less than the impedance resulting from the total system charging capacitance which, in a delta or wye system, consists of all three phases in parallel. This results in relatively larger amounts of available ground fault current for a single phase line-to-ground fault than for a single phase circuit. Moreover, grounding arrangements in such systems have no ability to detect phase faults.

Interphase fault detection arrangements have been disclosed in the prior art. For example, the patent in Hasegawa U.S. Pat. No. 4,363,065 discloses an interphase fault detection arrangement in which each phase has independent detection windings and includes a corresponding ground resistor in which fault detection is dependent upon voltage sensing across each ground resistor. The Patent to Gale et al. U.S. Pat. No. 5,587,864 discloses protection circuitry for short circuits and ground faults utilizing phase current sensors and differential sensors. The Baker et al. U.S. Pat. No. 5,521,787 discloses differential current fault protection utilizing both single and multiphase current sensing and the patents to Traub U.S. Pat. No. 3,584,259 and Lardennois U.S. Pat. No. 3,999,104 are directed generally to phase fault sensing utilizing independent resistors connected to ground.

SUMMARY OF THE INVENTION

Accordingly, it is an object of the present invention to provide a fault tolerant circuit arrangement for multiple phase electric machine which overcomes disadvantages of the prior art.

Another object to the invention is to provide a fault tolerant circuit arrangement for multiple phase electric machines having independent phase connections and a monitoring system which overcomes disadvantages of the prior art.

These and other objects of the invention are obtained by providing a fault tolerant circuit arrangement for multiple phase electrical machines having independently powered phase circuits each having a high impedance connection to ground so that the only path to ground resulting from a single insulation failure is through a high impedance connection and a monitor for at least one phase circuit to detect a phase circuit-to-phase circuit or phase circuit-to-ground insulation failure and an indicator for indicating a detected insulation failure. The circuit arrangement may be applied to multi-phase motor drive systems to enhance survivability of the systems by mitigating available fault current during the most common modes of electrical failure. While the circuit arrangement may be used with synchronous, induction or permanent magnet motors, it is especially beneficial when applied to permanent magnet motors in which the magnetic field cannot be de-energized at the onset of a fault.

As used herein the term "inter-phase fault" refers to faults involving multiple phases and the term "intra-phase fault" refers to a fault within a single phase, that is, from one winding turn to another winding turn.

With the circuit arrangement of the invention, fault current is mitigated for multi-phase, phase-to-phase and line-to-ground faults by utilizing independent motor phase windings in conjunction with an electric drive configuration which provides isolation between phases from the source of the fault and a high resistance system ground on each isolated phase. The same fault tolerant circuit arrangement is applicable to generators.

BRIEF DESCRIPTION OF THE DRAWINGS

Further objects and advantages of the invention will be apparent from the reading of the following description in conjunction with the accompanying drawings in which.

DESCRIPTION OF PREFERRED EMBODIMENTS

Figure 1:
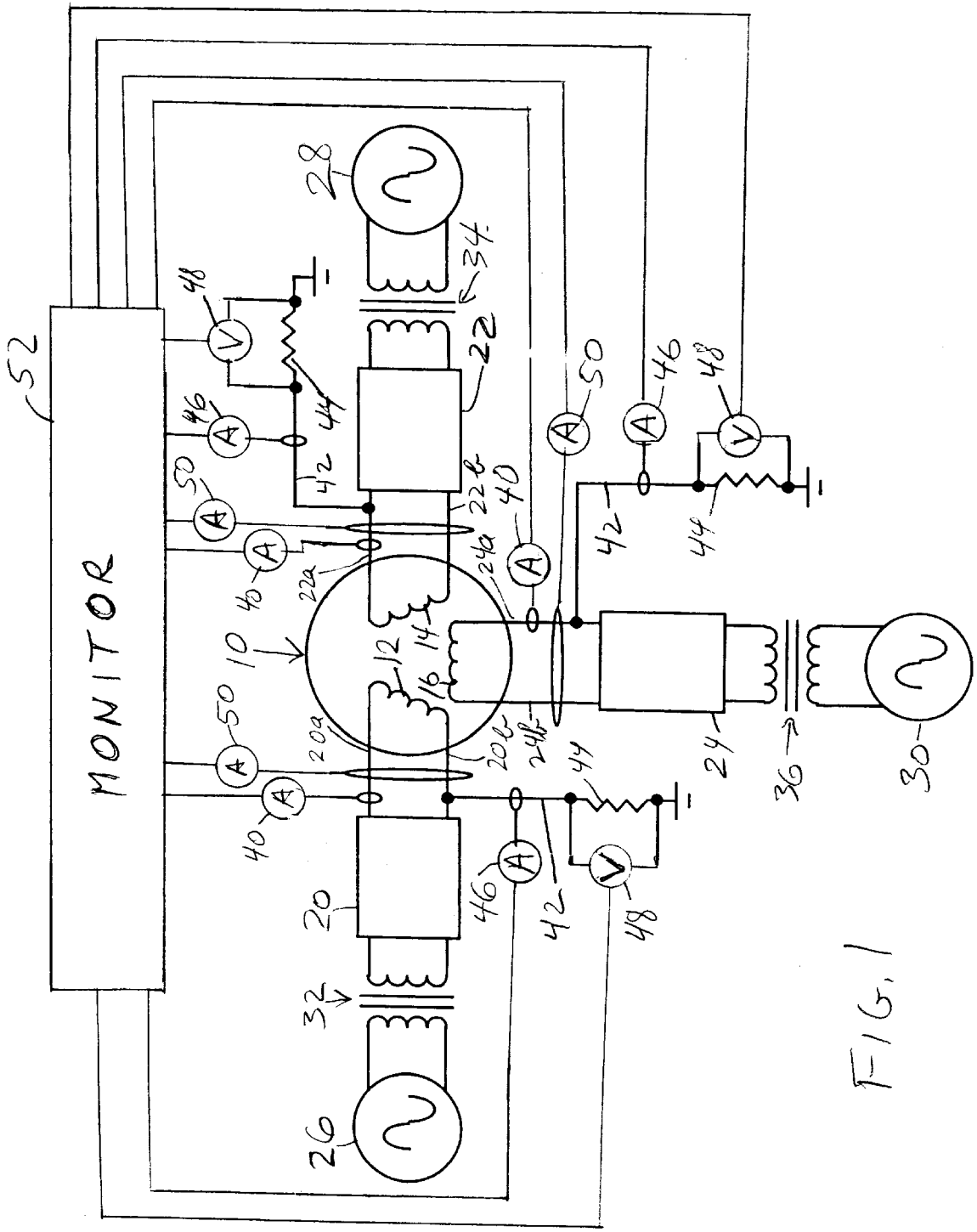
FIG. 1 is a schematic circuit diagram illustrating the arrangement of a representative embodiment of an electric machine configuration in accordance with the invention.

In the typical embodiment of the invention illustrated in the drawings, a multiple phase permanent magnetic motor 10 has three phase windings 12, 14 and 16 which are electrically isolated from each other. The windings have corresponding separate single phase drive units 20, 22, and 24, respectively, receiving power from corresponding AC sources 26, 28 and 30 through power transformers 32, 34 and 36, respectively. Thus, the motor 10 is driven by three independent power sources supplying power to isolated windings, but it is also possible to supply AC power to the drive units 20, 22 and 24 from independent polyphase, single phase or DC sources, if desired. For simplicity the arrangement illustrated in FIG. 1 shows single phase transformers 32, 34 and 36 but a single multi-phase transformer with isolated single phase output windings is also possible.

Each of the windings 12, 14 and 16 receives power independently from its corresponding single phase drive 20, 22 and 24 through corresponding pairs of conductors 20a and 20b, 22a and 22b, 24a and 24b, respectively, and a monitor arrangement includes an overcurrent sensor 40 for one conductor of each pair. In addition, one conductor of each pair is connected to ground through a conductor 42 and a high resistance 44 and the monitor arrangement includes an overcurrent sensor 46 which detects current through the ground conductor 42 while a voltage sensor 48 detects the voltage across the high resistance 44. The only normal connection between the separate phase windings is through the high resistances 44 to ground. The monitor arrangement also includes a differential current sensor 50 for each of the conductor pairs 20a and 20b, 22a and 22b and 24a and 24b which detects differential currents in the phase circuit that occur when current is diverted through the ground resistance 44 as a result of a three-phase, phase-to-phase or phase-to-ground fault.

With this arrangement, when a three-phase, phase-to-phase or ground fault occurs, the only path for the fault current to follow is through the conductors 42 and resistors 44 to ground, which limits the magnitude of the fault current. In this connection, the value of the resistance 44 is selected according to the charging capacitance associated with each individual phase, which provides overvoltage protection while assuring maximum fault current mitigation. This allows a higher ground impedance than if the resistance value were selected in accordance with the total system charging capacitance. In addition, each resistance 44 has sufficient current-carrying capacity to permit continued operation following an insulation failure.

The monitor arrangement also includes a monitoring unit 52 which receives signals from the differential current sensors 50 surrounding the conductor pairs of each motor phase winding, the overcurrent sensors 40 and 46, and the voltage sensors 48 and analyzes the received signals continuously to determine ground currents and provide early indications of insulation deterioration as well as the location of any faults.

Figure 2:
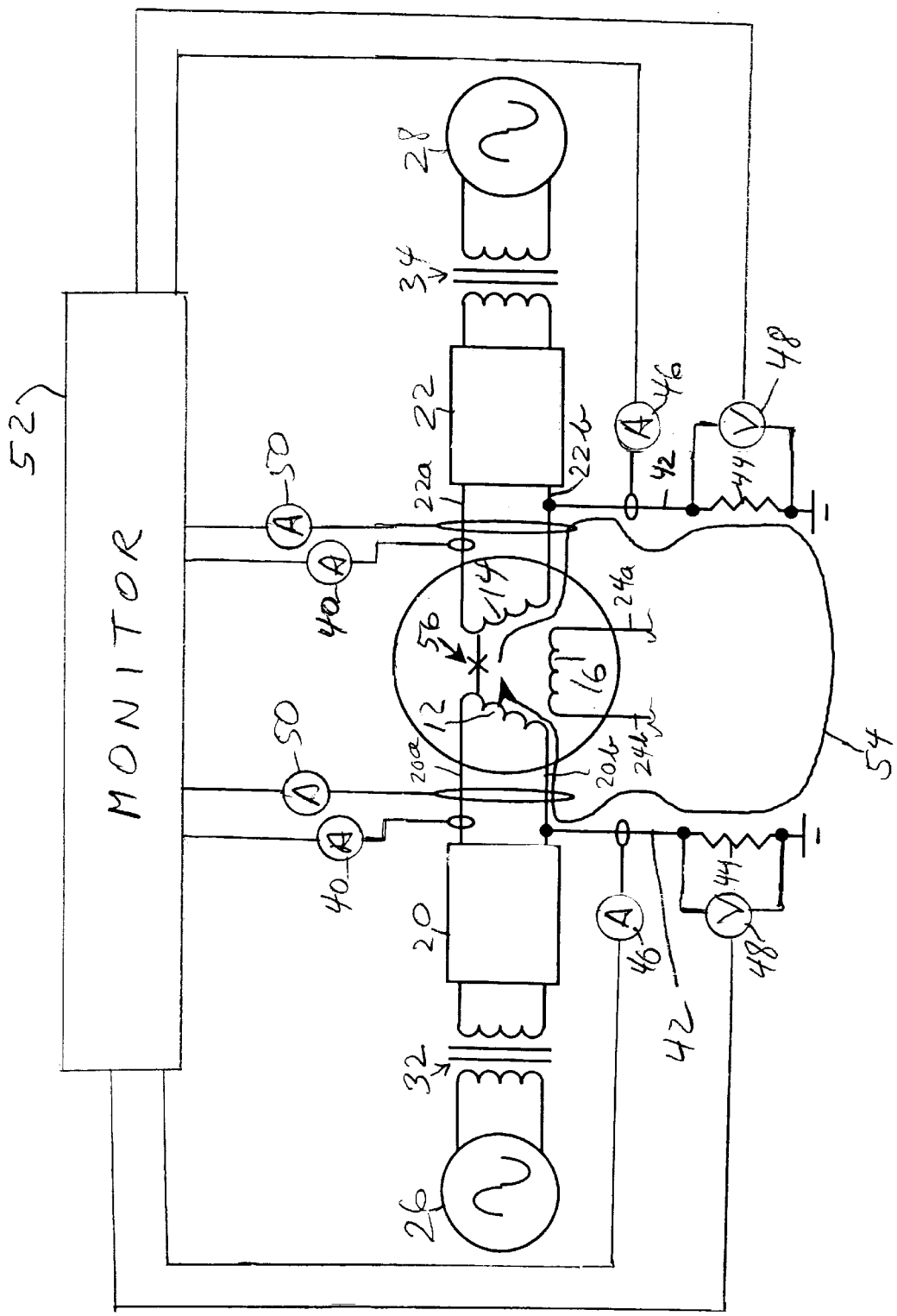
FIG. 2 is a schematic circuit diagram similar to FIG. 1 illustrating the effect of a phase to phase fault in an electric motor.

FIG. 2 illustrates a flow path 54 for the flow of fault current for a phase-to-phase fault 56 in the motor of FIG. 1. In this illustration the power supply to one of the motor windings 16 is omitted for purposes of clarity. Since the fault current flows through two ground conductors 42, the current and voltage sensors 46 and 48 at each high resistance ground connection provide a backup for the phase-to-phase fault detector, thereby enhancing reliability of motor protection. Accordingly, the system has increased reliability both for inter-phase and phase-to-ground faults, which are each detected by two separate arrangements.

An additional benefit results from the phase separation because inter-phase insulation monitoring is inherently provided by continuous monitoring of the ground currents by the sensors 46. This permits early detection of insulation deterioration between phases before a fault can occur.

A principal advantage of the arrangement of the invention is that fault currents resulting from three-phase and phase-to-phase faults are mitigated because the fault current must flow through the ground resistors as shown in FIG. 2. This minimizes equipment damage and maximizes personnel safety when a fault occurs. Moreover, the phases involved in a fault are automatically identified since phase faults are detectable by the grounding resistors, which is not possible with wye or delta connected arrangement, thereby enhancing system protection reliability. Moreover, any ground fault currents are reduced with this arrangement since the ground resistance in each phase is selected in proportion to the charging current associated with one phase rather than being based on the combination of all three phases, and the magnitude of the phase fault current is reduced to a level which is less than that for a line-to-ground fault, permitting continued operation during an inter-phase fault.

It should be noted, however, that this arrangement does not improved the protection for intra-phase faults, i.e. faults occurring within a single winding, such as a turn-to-turn fault. Operational problems resulting from electromagnetic interference are mitigated with the independent phase configuration because of the elimination of a three phase neutral tie point and associated common electromagnetic interference conduction paths which occur in conventional delta and wye connected winding.

Although the invention has been described herein with reference to specific embodiments, many modifications and variations therein will readily occur to those skilled in the art. Accordingly, all such variations and modifications are included within the intended scope of the invention.

We claim:

1. A fault tolerant circuit arrangement for multiple phase machines comprising:

an electric machine having a plurality of independently powered to provide isolation detween the phase circuits, each phase circuit having a high impedance connection to ground so that the only path to ground resulting from a single insulation failure is through the respective high impedance ground connection; and a monitor arrangement for at least one of the phase circuits responsive to a phase circuit-to-phase circuit or phase circuit-to ground insulation failure to provide an indication of such insulation failure.

2. A circuit arrangement according to claim 1 wherein the monitor arrangement comprises a differential current sensor for sensing significant differential current in at least one phase circuit as an indication of insulation degradation.

3. A circuit arrangement according to claim 1 wherein the monitor arrangement senses current flowing through one of the high impedance ground connection to indicate degradation of system insulation.

4. A circuit arrangement according to claim 1 wherein the monitor arrangement includes a differential current sensor and a ground current sensor in at least one phase circuit to provide redundant sensing of insulation degradation.

5. A circuit arrangement according to claim 1 wherein the monitor arrangement includes an active ground fault detector.

6. A circuit arrangement according to claim 1 wherein the high impedance connection to ground comprises a ground resistor having sufficient current capacity to permit continued electric machine operation following phase circuit-to-phase circuit or phase-circuit-to ground insulation failure.

7. A circuit arrangement according to claim 1 wherein the monitor arrangement initiates power shutdown in at least one phase circuit in response to detection of such insulation failure.

8. A method for limiting damage in a multiple phase electric machine resulting from a phase-to-phase or phase-to ground insulation failure comprising:

provding a plurality of independently powered phase windings for an electric machine to provide isolation detween the phase windings, each phase winding having a high impedance connection to a common ground so that the only path to resulting from a single insulation failure is through the respective high impedance ground connection; and providing a monitor for at least one phase circuit to detect a phase circuit to-phase circuit insulation failure or a phase circuit to-ground insulation failure and provide an indication of such insulation failure.

9. A method according to claim 8 wherein the monitor includes a differential current sensor for at least one phase current to sense significant differential current for the phase circuit to indicate such insulation failure.

10. A method according to claim 8 wherein the monitor includes a sensor for sensing current flowing through the high impedance ground connection and indicating insulation failure in response to sensing of a selected level of current.

11. A method according to claim 8 wherein the monitor includes a differential current sensor and a ground current sensor associated with at least one phase circuit to detect insulation failure, thereby providing redundant insulation failure detection.

12. A method according to claim 8 wherein the monitor includes an active ground fault detector.

13. A method according to claim 8 wherein the high impedance ground connection includes a ground resistor has sufficient current capacity to permit continued operation of the electric machine following such insulation failure.

14. A method according to claim 8 wherein the monitor initiates a shutdown of power to at least one phase circuit in response to detection of such insulation failure.

\* \* \* \* \*